(12) United States Patent
Yang et al.

(10) Patent No.: US 11,012,868 B1
(45) Date of Patent: May 18, 2021

(54) INDOOR PLANNING FOR DENSIFYING MOBILITY NETWORKS

(71) Applicant: AT&T Intellectual Property I, L.P., Atlanta, GA (US)

(72) Inventors: Yuning Yang, Basking Ridge, NJ (US); Wenjie Zhao, Princeton, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/906,780

(22) Filed: Jun. 19, 2020

(51) Int. Cl.
*H04W 16/20* (2009.01)
*H04W 24/10* (2009.01)
*H04W 24/08* (2009.01)

(52) U.S. Cl.
CPC .......... *H04W 16/20* (2013.01); *H04W 24/08* (2013.01); *H04W 24/10* (2013.01)

(58) Field of Classification Search
CPC ..... H04W 16/00; H04W 16/18; H04W 16/20; H04W 24/08
See application file for complete search history.

(56) References Cited

U.S. PATENT DOCUMENTS

| | | | |
|---|---|---|---|
| 5,465,390 A | 11/1995 | Cohen | |
| 6,112,091 A | 8/2000 | Van et al. | |
| 6,711,148 B1 | 3/2004 | Hills | |
| 7,035,643 B2 | 4/2006 | Slawitschka et al. | |
| 8,175,607 B2 | 5/2012 | Engstrom | |
| 8,195,171 B2 | 6/2012 | Bernini et al. | |
| 8,442,552 B2 | 5/2013 | Gallegos | |
| 9,037,142 B2 | 5/2015 | Jovanovic et al. | |
| 9,473,950 B2 | 10/2016 | Lanzo et al. | |
| 9,485,706 B2 | 11/2016 | Shinada et al. | |
| 9,609,524 B2 | 3/2017 | Pulleti et al. | |
| 9,668,146 B2 | 5/2017 | Lau | |
| 9,706,411 B2 | 7/2017 | Goswami et al. | |

(Continued)

FOREIGN PATENT DOCUMENTS

WO    2018156943    8/2018

OTHER PUBLICATIONS

Ibrahim et al., "Using Clustering Techniques to Plan Indoor Femtocell Base Stations Layout in Multi-floors," The Computer Journal, Mar. 2019, 13 pages.

(Continued)

*Primary Examiner* — Kevin Kim
(74) *Attorney, Agent, or Firm* — Amin, Turocy & Watson, LLP

(57) ABSTRACT

An architecture for providing indoor planning data that can be used to increase the density of mobility networks. A method can comprise receiving, via network equipment, resource exhaustion data indicative of radio spectrum usage within a determined bin representing a defined geographic area; receiving, via the network equipment, traffic data associated with the determined bin, wherein the traffic data indicates a volume of data flowing into the determined bin; receiving, via the network equipment, coverage data representing a quality of service metric data indicative of a determined reference signal receive power metric; and based on applying a ranking process to the resource exhaustion data, the traffic data, and the coverage data, generating a ranked list of structures, wherein a structure of the ranked list of structures includes the determined bin.

20 Claims, 11 Drawing Sheets

(56) References Cited

U.S. PATENT DOCUMENTS

| | | |
|---|---|---|
| 9,730,080 B2 | 8/2017 | Wang et al. |
| 9,888,390 B2 | 2/2018 | Jones et al. |
| 10,057,802 B2 | 8/2018 | Gunnarsson et al. |
| 10,172,016 B2 | 1/2019 | Gallegos et al. |
| 10,200,900 B2 | 2/2019 | Barnickel et al. |
| 10,412,630 B2 | 9/2019 | Olson |
| 2005/0233751 A1 | 10/2005 | Bardwell |
| 2008/0280565 A1 | 11/2008 | Jevremovic et al. |
| 2012/0157119 A1* | 6/2012 | Shu .................. H04W 36/0072 455/456.1 |
| 2014/0244817 A1 | 8/2014 | Pulleti et al. |
| 2020/0059797 A1 | 2/2020 | Judge et al. |
| 2020/0213864 A1* | 7/2020 | Vanek .................... G06Q 50/32 |

OTHER PUBLICATIONS

Kadir et al., "Strategy to Improve the Indoor Coverage for Mobile Station," Student Conference on Research and Development Proceedings, Shah Alam, Malaysia, 2002, 4 pages.

Kim et al., "Mobility Modeling and Traffic Analysis in Three-Dimensional Indoor Environments," IEEE Transactions on Vehicular Technology, vol. 47, No. 2, May 1998, 12 pages.

Seltzer et al., "Indoor Coverage Requirements and Solutions," IEE Colloquium on Antennas and Propagation for Future Mobile Communications (Ref. No. 1998/219), London, UK, 1998, 4 pages.

\* cited by examiner

| RESOURCE EXHAUSTION DATA PER DEFINED BIN | |
|---|---|
| 5 - 6 | 12 months or less to resource exhaustion |
| 4 - 5 | 13 - 18 months to resource exhaustion |
| 3 - 4 | 19 - 24 months to resource exhaustion |
| 2 - 3 | 25 - 30 months to resource exhaustion |
| 1 - 2 | 31 - 36 months to resource exhaustion |
| 0 - 1 | 37 months or more to resource exhaustion |

Table 1

| DATA DENSITY LAYER PER DEFINED STRUCTURE | |
|---|---|
| 5 - 6 | 100+ GB |
| 4 - 5 | 80 – 100 GB |
| 3 - 4 | 60 – 80 GB |
| 2 - 3 | 40 – 60 GB |
| 1 - 2 | 20 – 40 GB |
| 0 - 1 | 0 – 20 GB |

Table 2

| RECEIVED SIGNAL RECEIVED POWER PER STRUCTURE DATA | |
|---|---|
| 5 - 6 | Worse than -115 dBm |
| 4 - 5 | -110 to -115 dBm |
| 3 - 4 | -105 to -110 dBm |
| 2 - 3 | -100 to -105 dBm |
| 1 - 2 | -90 to -100 dBm |
| 0 - 1 | Better than -90 dBm |

Table 3

| SIGNAL TO NOISE DATA PER STRUCTURE DATA | |
|---|---|
| 5 - 6 | Worse than -10 dB |
| 4 - 5 | -5 to -10 dB |
| 3 - 4 | 0 to -5 dB |
| 2 - 3 | 5 to 0 dB |
| 1 - 2 | 10 to 5 dB |
| 0 - 1 | Better than 10 dB |

Table 4

FIG. 7

INDOOR PLANNING FOR DENSIFYING MOBILITY NETWORKS

TECHNICAL FIELD

The disclosed subject matter provides systems and methods for providing indoor planning to increase the density of mobility networks.

BACKGROUND

Traffic volumes in mobility networks are growing very fast, more than ten-fold in the past couple of years. Radio spectrum and location within which new network equipment (e.g., mobile network operator (MNO) entity devices such as base station devices, and the like) is fast approaching exhaustion. Resource exhaustion (e.g., limited spectrum and/or places to situate network equipment) is particularly evident in the context of spectrum allocations, since assignable and/or usable spectrum is a finite/limited resource, and traffic volumes are growing at rates beyond the capacities of assignable spectrum.

BRIEF DESCRIPTION OF DRAWINGS

FIG. 7 provides depiction a group of table that can be used to determine indoor planning data that can be used to increase the density of mobility networks, in accordance with aspects of the subject disclosure.

DETAILED DESCRIPTION

Figure 1:
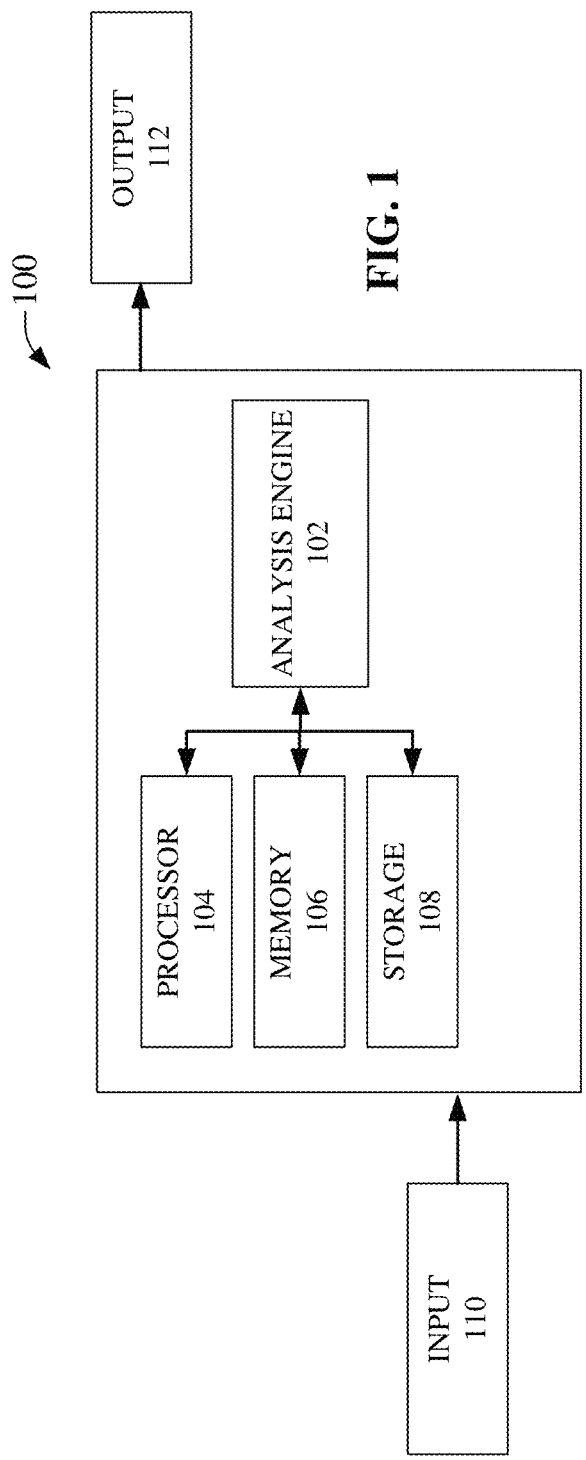
FIG. 1 is an illustration of a system that provides indoor planning data that can be used to increase the density of mobility networks, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

The disclosed systems and methods, in accordance with various embodiments, provide a system, apparatus, or device comprising: a processor, and a memory that stores executable instructions that, when executed by the processor, facilitate performance of operations. The operations can comprise receiving, via network equipment, resource exhaustion data indicative of radio spectrum usage within a determined bin representing a defined geographic area; receiving, via the network equipment, traffic data associated with the determined bin, wherein the traffic data indicates a volume of data flowing into the determined bin; receiving, via the network equipment, coverage data representing a quality of service metric data indicative of a determined reference signal receive power (RSRP) metric; and based on applying a ranking process to the resource exhaustion data, the traffic data, and the coverage data, generating a ranked list of structures, wherein a structure of the ranked list of structures is included in the determined bin.

In the context of the foregoing, the traffic data in some embodiments can comprise comprises clutter data representing user equipment in communication with the network infrastructure situated in the determined bin. In other embodiments, the traffic data can comprise user equipment behavior data representing an call establishment event between user equipment and the network infrastructure. Further, the traffic data can also comprise subscriber location address data representing an address of a user identity associated with user equipment located within the determined bin. In some instances, the traffic data can comprise enterprise location data representing an address of an enterprise located within the determined bin. In various additional embodiments, the traffic data can be supplied to a data density layer weighing process that determines a weight associated with clutter data included in the traffic data, wherein the weight can be determined as a function of identifying user equipment in communication with the network infrastructure located within the determined bin.

Additionally, in accordance with the foregoing, the structure can be associated with attribute data representative of an age of the structure, an address of the structure, and global positioning infrastructure coordinate data associated with the structure. Further, in instances where the structure is a first structure, the first structure can be associated with attribute data representative of usage type data associated with the first structure, relative height data representative of a first height of the first structure in comparison with a second height of a second structure of the ranked list of structures, first construction date data associated with the first structure, and second construction date data associated with the second structure.

In accordance with further embodiments, the subject disclosure describes a method and/or process, comprising a series of acts that, for example, can include: receiving, by a system comprising a processor, resource exhaustion data indicative of radio spectrum usage within a determined bin representing a defined geographic area; receiving, by the system, traffic data associated with the determined bin, wherein the traffic data indicates a volume of data flowing into the determined bin; receiving, by the system, coverage data representing a quality of service metric data indicative of a determined signal to noise ratio data; and generating, by the system, an ordered list of structures by executing a ranking process to the resource exhaustion data, the traffic data, and the coverage data, wherein a structure of the ordered list of structures is included in the determined bin.

Additional acts can include: determining, by the system, the volume of data based on clutter data representing user equipment in communication with network equipment, wherein the user equipment and the network equipment are located within the determined bin; and determining, by the system, the volume of data based on user equipment behavior data representing an call establishment event facilitated by user equipment via network equipment.

In regard to the foregoing acts, the traffic data can comprise: subscriber location address data representing an address of a user identity associated with user equipment located within the determined bin; and enterprise location data representing an address of an enterprise entity located within the determined bin.

The traffic data can be forwarded to a data density layer weighing process that determines a weight associated with clutter data included in the traffic data, wherein the weight can be determined based on first user equipment being in communication with second user equipment via network equipment, and wherein the first user equipment and the network equipment are located within the determined bin. Additionally, the traffic data can be forwarded to a data density layer weighing process that determines a weight associated with clutter data included in the traffic data, wherein the weight is determined based on first user equipment being in communication with second user equipment via network equipment, and wherein the second user equipment and the network equipment are located within the determined bin. Further, in some embodiments, the traffic data can be forwarded to a data density layer weighing process that determines a weight associated with clutter data included in the traffic data, wherein the weight is determined based on first user equipment being in communication with second user equipment via network equipment, and wherein the network equipment is located within the determined bin. Moreover, where the structure is a first structure, the first structure can be associated with attribute data representative of usage type data associated with the first structure, relative height data representative of a first height of the first structure in comparison with a second height of a second structure of the ordered list of structures, first construction date data associated with the first structure, and second construction date data associated with the second structure.

In accordance with still further embodiments, the subject disclosure describes a machine readable medium, a computer readable storage device, or non-transitory machine readable media comprising instructions that, in response to execution, cause a computing system comprising at least one processor to perform operations. The operations can include: receiving resource exhaustion data indicative of radio spectrum usage within a determined bin representing a defined geographic area; receiving traffic data associated with the determined bin, wherein the traffic data indicates a volume of data flowing into the determined bin; receiving coverage data representing a quality of service metric data indicative of a determined signal to noise ratio data; and generating an ordered group of structures by executing an ordering process to the resource exhaustion data, the traffic data, and the coverage data, wherein a structure of the ordered group of structures is included in the determined bin.

Additional operations can include determining the volume of data based on cluster data representing a clustering of user equipment in communication with network equipment, wherein the user equipment is located within the determined bin; and determining the volume of data based on user equipment behavior data representing an call establishment event facilitated by user equipment via network equipment.

A remedy to the issue of running out of resources to accommodate increases in traffic volumes is to increase the density of a mobile network operator's network; concentrate the number of network equipment located within defined areas—rather than having a few network equipment in a defined area, having many tens, hundreds, thousands, etc. of network equipment within the defined area. Unfortunately, the number of macro transmitter towers, etc. are typically limited and generally cannot be scaled up further. Additional macro transmitter towers typically cannot be added to ameliorate the situation with regard to the impending forthcoming surge in traffic volumes. One solution is to use small cells—outdoor as well as indoor small cell architectures. Nevertheless, in order to ensure optimal placement of the indoor and/or outdoor small cell transceiver architectures (e.g., gNodeB equipment, eNodeB equipment, base station equipment, access point equipment and the like), an understanding of the geographical topologies of defined areas inclusive of structures located within the defined area (e.g., buildings, electrical grid structures, tower structures, utility infrastructure, such as telephone poles, street lighting, etc. need to be investigated. Such appraisals, surveys, and/or reviews can be carried out based, for example, on location code (e.g., global positioning satellite (GPS) coordinates, geo-location codes, postal code, ZIP code, and the like), on a neighborhood wide scale, citywide scale, national scale, or continental scale, etc.

In accordance with various embodiments, the subject application discloses a system whereby based on entering criteria and initiating a process, a ranked list of structures (e.g., buildings, utility towers, geographic features, and the like) based at least on the criteria will be output. The ranked or prioritized listing can then be used to install microcell devices to service expected or impending increases in traffic volume flows as a function of, for instance, location codes, in a defined or definable area, such as: a neighborhood, a city, a group of cities, groups of contiguous cities, conurbations, nation states, one or more abutting nation states, and/or continent wide, etc.

Ab initio, when the described systems and/or methods are initiated no structure (e.g., small, tall, long, or short) is omitted from the objective criteria used to order or rank the structures. The disclosed systems and/or methods in accordance with various embodiments determines a structure's relative ranking or ordering based on the key performance indicators that are input to the system. Accordingly, structures that may intuitively have been discounted in some situations may find applicability in other situations. Therefore, no structure or building is discounted for having minimal utility. Further, because the planning associated with increasing the densities of mobility networks has a small budget, it is important to rapidly narrow down the list of probable candidate structures.

The aim or goal of the subject disclosure is to identify, quantify, and/or prioritize the network infrastructure quality, capacity, and/or coverage needs/requirements for each structure in a defined area. The benefit of the subject disclosure is that the analysis provided by operation of the disclosed systems and methods identifies structures (e.g., buildings) so that there does not need to be any guesswork and/or manual work tasks based on subjective judgment. The subject disclosure objectively improves consistency in result as all assessments are based on objective criteria. The objective criteria can be applied nationwide—one group of standardized criteria, or collections of common normalized criteria utilized nationwide on a consistent basis. By identifying, prioritizing, and/or quantifying the quality, capacity, and/or coverage requirements for structures in one or more defined areas, finite/limited resources (e.g., spectrum resources) can be better allocated/assigned to meet the expected growth in demand for additional spectrum due to increasing traffic volume flows without actually adding additional spectrum resources. Additionally, the systems and/or methods disclosed herein, provide a predictive tool to better forecast traffic patterns and/or spectrum use into defined or definable future periods.

The disclosed subject matter, in accordance with various embodiments, provides systems and/or methods that can offer granularity with regard to focusing on identified or identifiable structures. Particular identified or particular identifiable structures (e.g., structures that meet threshold criteria, such as height, age, etc.) can be analyzed from the perspective of quality, capacity, and/or coverage requirements to identify, quantify, and/or prioritize resource allocations into a defined or definable prospective future. In accordance with some embodiments, the subject disclosure provides systems and/or methods that can individuate analyses of structures based at least on a particular structure's attributes (attribute data) such as: address data, global positioning satellite coordinate data, geo-location data, geographical latitude/longitude data, building type data, area data (e.g. square footage), whether the structure is a multi-story structure or single storage structure, the elevation of the structure (e.g., in comparison to sea level, in comparison to the surrounding terrain), the height of the structure, whether the structure is the highest/lowest structure amongst other structures in a surrounding area, postal code data (e.g. ZIP Code data), construction date data, construction materials used to construct the structure, etc. this data can be provided as input data to, as well provided as output data from, the disclosed systems and/or methods.

With reference to the Figures, FIG. 1 illustrates a system 100 for providing indoor planning data that can be used to increase the density of mobility networks, in accordance with aspects of the subject disclosure. As illustrated system 100 can comprise analysis engine 102 that can be communicatively coupled to processor 104, memory 106, and storage 108. Analysis engine 102 can be in communication with processor 104 for facilitating operation of computer and/or machine executable instructions and/or components by analysis engine 102, memory 106 for storing data and/or the computer or machine executable instructions and/or components, and storage 108 for providing longer term storage for data and/or machine and/or computer machining instructions. Additionally, system 100 can receive input 110 for use, manipulation, and/or transformation by analysis engine 102 to produce one or more useful, concrete, and tangible result, and/or transform one or more articles to different states or things. Further, system 100 can also generate and output the useful, concrete, and tangible results, and/or the transformed one or more articles produced by analysis engine 102, as output 112.

In some embodiments, system 100 can be an Internet of Things (IoT) small form factor device capable of effective and/or operative communication with a network topology. Additionally in alternative embodiments, system 100 can be any type of mechanism, machine, device, apparatus, and/or instrument that can be utilized to facilitate provision of indoor planning data that can be used to increase the density of mobility networks. Examples of types of mechanisms, machines, devices, apparatuses, and/instruments can include virtual reality (VR) devices, wearable devices, heads up display (HUD) devices, machine type communication devices, and/or wireless devices that communicate with radio network nodes in a cellular or mobile communication system. In various other embodiments, system 100 can comprise tablet computing devices, handheld devices, server class computing machines and/or databases, laptop computers, notebook computers, desktop computers, cell phones, smart phones, commercial and/or consumer appliances and/or instrumentation, industrial devices and/or components, personal digital assistants, multimedia Internet enabled phones, Internet enabled devices, multimedia players, aeronautical/avionic devices associated with, for example, orbiting satellites and/or associated aeronautical vehicles, and the like.

Analysis engine 102 can receive, as input 110, key input criteria that can be used to identify, quantify, and/or prioritize the quality, capacity, and/or coverage needs/requirements for all structures within defined or definable regions. The key input criteria, amongst many other input criteria, can include data pertaining to resource (e.g., spectrum) exhaustion; data pertaining to traffic volumes; data relating to reference signal received power (RSRP) measurements, data pertaining to signal to noise ratio measurements, and the like. In regard to spectrum exhaustion data this data can be used to identify subsectors, sectors, groups of subsectors, groups of sectors, micro cells, macro cells, groupings of micro cells and/or groupings of macro cells within prospective defined periods of future time (e.g., within the next 12 months, within the next 13-18 months, within the next 19-24 months, etc.) that have, or will have, reached exhaustion; an inability to satisfy or service expected increases in traffic volume flows through the addition of supplementary resources to augment a subsector, sector, group of subsectors, group of sectors associated with network equipment devices, or groupings of network devices capabilities to handle additional traffic volumes and the ensuing degradation in quality of service (QoS) metrics.

Determinations as to whether subsectors, sectors, group of subsectors, groups of sectors associated with network equipment devices, or groupings of network devices are approaching capacity, or are operating beyond capacity, can be performed on a periodic basis. For instance, a determination as to whether subsectors, sectors, groups of subsectors, groups of sectors associated with network equipment devices, or groupings of network infrastructure are approaching their operations capacities can be performed hourly, daily, weekly, every fortnight, monthly, quarterly, semi-annually, etc. Additionally and/or alternatively in some embodiments, determinations as to whether or not subsectors, sectors, groups of subsectors, groups of sectors associated with network equipment devices, or groupings of network infrastructure devices can be performed on an as needed basis.

It should be noted that the subject application addresses and/or provides an indoor solution to the issue of identifying, quantifying, prioritizing the quantity, capacity, and/or coverage requirements for individuated structures in a defined or definable area. Accordingly, analysis engine 102 can receive a data density layer construct data that can be envisioned in some embodiments as being representative of a high resolution pointillistic heat map, wherein distinct dots of color applied in patterns can represent traffic flows and/or traffic patterns associated with one or more structure. In additional and/or alternative embodiments, the data density layer data structure data, received by analysis engine 102, can be representative of a divisionistic representation of traffic congestion and/or traffic volumes, wherein colors can be separated into individual dots or patterns that optically interact with one another (e.g., the colors can contrast with one another and/or the colors can gradually (or seamlessly) blend into one another). At a high level each individual dot or point can represent a "bin" that can be associated with a defined area on a geographic map. For instance, in some embodiments a bin can represent an area measuring five square meters (e.g., 5 $m^2$) on the geographic map. In other embodiments, a bin can represent an area measuring ten square meters (e.g., 10 $m^2$). In still further embodiments, the bin can represent an area measuring an acre (e.g., 43,560 $ft^2$). It will be apparent from the foregoing that the size of each individual bin in a grouping of individual bins can be of a uniform size in some instances (e.g., all the bins represent a map area that is the same size). In other instances, each individual bin of the grouping of bins can be of disparate sizes (e.g., a first bin can represent a map area of 10 $m^2$, whereas another bin can represent a map area of 20 $m^2$). In instances where the bin parameters differ this can be based on a rural/urban divide, or a city/suburban divide, where structures of significant dimension associated with vast traffic flows are generally not present in rural areas (or suburban areas) in contrast to cities or urban areas where there can be many significant structures associated with appreciable traffic volumes.

In regard to the foregoing, it should be apparent that each point or dot can be representative of an individual bin regardless of bin dimension, though the magnitude of the point or dot can correlate to the dimension of the bin area (e.g., a point or dot representative of 5 $m^2$ bin typically will be smaller than a point or dot representative of 10 $m^2$ bin). Further, it should also be observed that the sizing of the bins can be a tunable parameter.

Each individual bin can provide demand metrics representing a current demand for resources (and/or demand metrics representing expected demands for resources into a defined or definable future time horizon) for the individual bin. For high-rise structures or low-rise structures the demand for resources can differ in some instances. In other instances, the demand for resources can be the same between high-rise and low-rise structures. In other instances the demand for resources in low-rise structures can outstrip the demand for resources in high-rise structures. The demand for resources can be determined for identified time periods throughout the day. For example, every minute, every hour, at specified times (e.g., 6 am, 10 am, 12 am, 3 pm, 6 pm, 10 pm, 12 pm, . . . ), at randomly selected time points, continuously for defined durations of time (e.g., continuously between 6 am-9 am, continuously between 3 pm-9 pm, etc.), or randomly at identified/defined time intervals (e.g., from 8 am-9 am continuously monitor the demand for resources; from 1 pm-3 pm monitor the demand for resources every 5 minutes; from 2 am-5 am monitor demand for resources on the hour mark; . . . ). As will be appreciated by persons having ordinary skill, one or more system clock can be used to achieve the timing aspects associated with the subject disclosure.

Analysis engine 102 can determine from the foregoing demand metrics, for each identified bin, the periods during which demand within a identified bin exceeds one or more threshold value. These periods can be aggregated. The pointilistic representation of the demand for resources (or the divisionistic representation of the demand for resources) can be overlaid over top of a polygonal representation of the structure. The polygonal representation of the structure overlaid over the pointillistic representation of the demand for resources (or the divisionistic representation of the demand for resources) can provide structure level traffic flows (e.g., traffic demand individuated by structure or building). Using the polygonal representation of the structure overlaid over the pointillistic representation of resource demands per structure can, for instance, identify which structures in collections of structures are high traffic areas and which structures in the collections of structures that are low traffic areas.

In many embodiments and/or instances, some structures can be located near, or relatively proximate, to network infrastructure (e.g., microcell infrastructure, macro-cell infrastructure, base station infrastructure, femtocell infrastructure, picocell infrastructure, access point infrastructure, internet of things (IoT) infrastructure, . . . ) owned, controlled, and/or monitored by mobile network operator (MNO) entities. Structures situated proximate to network infrastructure typically will have good to acceptable quality of service metrics as determined using data such as signal-to-noise ratio (SNR) data, reference signal received power (RSRP) data, reference signal received quality (RSRQ) data, returned signal strength indicator (RSSI) data, etc. In this disclosure, structures that exhibit measurements, based on SNR data values, RSRP data values, RSRQ data values, and the like, that are acceptable and/or high will generally not be ranked or ordered as high as structures that are determined to have comparatively low or negligible SNR values, low or negligible RSRP values, low or negligible RSRQ values, etc. In other words, based on SNR data values, RSRP data values, RSRQ data values, and the like, when analysis engine 102 determines that a structure has a low to unacceptable value, such a structure can be ranked or ordered higher in a grouping of structures that have better SNR data values, RSRP data values, RSRQ data values, etc.

The input that analysis engine 102 receives (e.g., exhaustion data representing data used to identify subsectors, sectors, groups of subsectors, groups of sectors, micro cells, macro cells, groupings of micro cells and/or groupings of macro cells within prospective defined periods of future time will run out of spectral capacity; data density layer data pertaining to traffic flows or traffic volumes directed to, servicing, and/or traversing through structures, at defined or definable instances of time; and coverage quality data representing quality metrics such as SNR values, RSRP values, RSRQ values, and the like, at one or more identified or identifiable time points or one or more identified or identifiable time durations (e.g., time range)) can be but three key ordering/ranking criteria that can be used to establish a ranking or ordering of structures within defined or definable areas (e.g., cities, towns, counties, provinces, countries, etc). Analysis engine 102 by combining and/or synthesizing these three ordering/ranking criteria can generate a ranking or ordering of structures within identifiable or identified geographic areas. This ordered/ranked list of structures can serve three purposes (1) an indicator of spectrum/resource exhaustion; (2) an indication of growth in traffic within a particular structure and/or in a defined geographic area; and (3) a mechanism to identify structures that currently have coverage shortcomings with regard to extant network infrastructure facilities. Accordingly, should a structure rank high in one or more of the three key criteria, i.e., (a) resources associated with servicing a particular structure are approaching exhaustion; (b) traffic loads or traffic volumes to the structure, traversing within the structure, and/or existing from the structure; and/or (c) the coverage provided by extant network infrastructure is negligible or inadequate to service the structure, these structures can be assigned high rankings in comparison to structures that have better characteristics in relation to the key criteria.

With regard to the data density layer (DDL) data used by analysis engine 102, the DDL data can comprise four layers. A first layer (clutter data) can provide information as to where user equipment associated with a MNO entity is located in relation to the MNO entity's network infrastructure equipment. An example of such data is provided by AriesoGEO. The clutter data received from AriesoGEO can be assigned weighting values. For example, if there are 100 user equipment devices in a defined area connected to a MNO transmission tower at a particular instance in time, the clutter data can provide snapshot information as to which bin (10 m$^2$, 20 m$^2$, ...) the MNO transmission tower should be assigned and as a consequence to which bin each of the 100 user equipment devices should be assigned. The clutter data needs to be as accurate as possible so as to capture the actual reality of where user equipment is actually being used. The clutter data can represent the amount of traffic traversing through the MNO's network infrastructure at a bin level (e.g., network traffic traversing through a defined or definable area—5 m$^2$, 10 m$^2$, 20 m$^2$, 25 m$^2$, etc. bin). The bin or a grouping of bins can correlate to the footprint of a structure. At this juncture it should be noted that a structure such as a large manufacturing facility can cover a large footprint area, e.g., 10,000 m$^2$, and as such, for instance, multiple 25 m$^2$ bins can be used to represent a structure of such magnitude. Thus a structure of massive scale can be represented by multiple bins. Conversely, a structure that is situated on a small footprint (e.g., 100 m$^2$) can be represented by fewer bins. It should nevertheless be noted, structures of small footprint, because they can, for example, be multilevel structures, can have levels of traffic traversing through them that can be as significant as (or surpass) the level of traffic traversing though structures situated on more massive footprints. In regard to the foregoing, bin level criteria can also be indicative of whether or not network traffic is being used to service user equipment located inside a structure or whether or not user equipment is being serviced outside the structure (e.g., on the street).

In regard to determining coverage, or lack thereof, provided to user equipment by extant network infrastructure, this can be identified by analysis engine 102 through use of firmware, such as IQI, that can be embedded in user equipment and/or network equipment. Such firmware can monitor radio frequency (RF) events, such as user equipment establishing calls, terminating calls, connecting to network infrastructure, disconnecting from network infrastructure, hopping between various disparate segments of the network infrastructure, dropped call events, and the like. The firmware can report a time of a RF event, type of RF event, location of the RF event (e.g., where, geographically, the RF event occurred—using GPS location codes, geographical longitudinal and/or latitudinal coordinates, geo-location tags generated by user equipment and/or network infrastructure, ...). In cases where the firmware is associated with user equipment, RF events and/or associated data representing the RF events can be reported back to network equipment comprising a MNO entity's network infrastructure.

In various embodiments, the data representing RF events can be fed back to analysis engine 102 from user equipment. RF event data, in conjunction with clutter data representing information as to where user equipment associated with a MNO entity is located in relation to the MNO entity's network infrastructure equipment (e.g., obtained from AriesoGEO), can be used to pinpoint where user equipment is located at particular instances in time. The RF event data returned by user equipment to analysis engine 102 can represent another layer (a second layer) of DDL data used by analysis engine 102 to assess user equipment behavior.

A further layer (third layer) of DDL data can comprise enterprise location data. Enterprise location data can be representative of business enterprises situated in a defined area. Example business enterprises can include manufacturing facilities, hospitals, government offices, airports, military facilities, museums, arenas/stadiums, convention centers, shopping malls, and other high demand venues. Generally, enterprise data can include at least the location of the business enterprises (e.g., GPS coordinates, geographical longitudinal and/or latitude coordinates, generated geo-location codes, ZIP code, postal area codes, ...).

An additional layer (fourth layer) of DDL data can comprise subscriber information location (SIL) data. Generally SIL data can be provided by, and/or retrieved from, database equipment (e.g., databases of databases) that can be affiliated with, under the control of, and/or maintained by, one or more MNO entities. Typically, SIL data maintained within, and/or retrieved from, database equipment can represent billing data and/or subscriber data. Billing data and/or subscriber data can comprise billing addresses assigned to a subscriber entity (e.g., a user, business, ...), subscriber usage statistics (e.g., when a customer uses their assigned user equipment, the most or least hours of use of the user equipment, duration of time of use of the user equipment, trends of usage associated with the user equipment, ...), and the like.

Analysis engine 102, in response receiving data pertaining to (a) resource exhaustion metrics; (b) traffic load or traffic volume metrics to structures, traversing within structures, and/or existing from structures; and/or (c) coverage metrics related to how the extant network infrastructure is servicing structures, can use the following ranking or ordering formulation to identify and/or determine candidate structures that, in accordance with various embodiments, on an objective basis, will beneficially assist a MNO to mitigate current (and/or prospective) resource allocation deficiencies, ameliorate traffic volume and/or traffic flow bottlenecks, and/or overcome insufficiencies with regard to identified or identifiable coverage concerns in the context of determined structures.

$$(3 \times \text{Expected Resource Exhaustion value}) + (2 \times \text{DDL value per structure}) + (0.5 \times \text{RSRP value per structure}) + (0.5 \times \text{SNR value per structure})$$

In regard to the foregoing ranking or ordering formulation, the weighting values (e.g., 3, 2, 0.5, and 0.5 respectively associated with: "Expected Resource Exhaustion value," "DDL value per structure," "RSRP value per structure," and "SNR value per structure"), can be variable values that have been determined heuristically via common experience. The foregoing weighting values have, to date, proven to be beneficial in the determination of ranked or ordered listings of structures within determined or determinable geographic areas. These variable values can be adjusted or tuned based on changing circumstance and/or differing requirements. In some embodiments the variable values can be adjusted or tuned using artificial intelligence, deep learning, and/or machine learning processes and/or paradigms, wherein probabilistic assessments can be employed to determine appropriate weight values. In other embodiments, cost benefit analyses can be conducted to determine the various costs associated with taking particular courses of action (e.g., selecting a identified variable value); determine the various benefits associated with taking the courses of action (e.g., selecting the identified variable value); and comparing the resultant costs and resultant benefits to determine a weight value to use. In other embodiments, the cost benefit analyses can take the form of determining the various costs associated with not adopting a particular course of action; determining the benefits associated with adopting the course of action; and thereafter comparing the resultant benefits and costs to determine an appropriate weight value to employ. Additionally and/or alternatively, Pareto efficiencies and/or Pareto optimality analyses can be effectuated to ensure that no individual criterion, or grouping of preference criteria, is made better off at the expense of making another individual criterion, or grouping of preference criteria, worse off.

With regard to the "Expected Resource Exhaustion value" can be a value within a range of values (e.g., 0-6) representative of when resource exhaustion is expected to occur within a particular bin. In regard to "DDL value per structure," this too can be another value within another range of values (e.g., 0-6) indicative of volumes of traffic (measured, for example, in gigabytes) flowing to, within (through), and/or from a particular structure, wherein the structure can be represented by one or more bins. In the context of "RSRP value per structure," this is a further value with a further range of values (e.g., 0-6). The range of values associated with RSRP value per structure can be a unit measure that indicates a power ratio expressed in decibels with reference to one milliwatt (e.g., dBm) as observed from the perspective of the structure. Lastly, in connection with "SNR value per structure," this can be an additional value associated with an additional range of values (e.g., 0-6). This additional range of values can be associated with SNR values as determined from the perspective of the structure.

Figure 2:
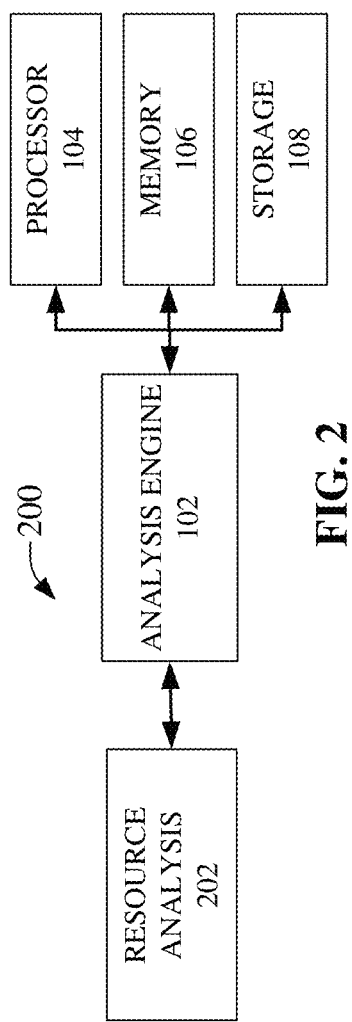
FIG. 2 is a depiction of a further system that provides indoor planning data that can be used to increase the density of mobility networks, in accordance with aspects of the subject disclosure.

With reference to FIG. 2 depicted therein is an additional illustration of system 100, now referenced as system 200, for the provision or supply of indoor planning data that can be used to increase the density of mobility networks, in accordance with aspects of the subject disclosure. As illustrated system 200 can include a component that facilitates resource analysis 202, and that, in collaboration with analysis engine 102, processor 104, memory 106, and/or storage 108, determines when resource exhaustion at a bin level or collection of bins (e.g., correlative of a structure, such as an office tower, sporting arena, radio tower, etc.) is expected to occur.

Resource analysis 202 can use resource utilization data (e.g., current and/or historical) received from user equipment and/or network infrastructure to identify subsectors, sectors, groups of subsectors, groups of sectors, micro cells, macro cells, groupings of micro cells and/or groupings of macro cells associated with network infrastructure to determine within prospective determined periods of future time, subsectors, sectors, groups of subsectors, groups of sectors, micro cells, macro cells, groupings of micro cells and/or groupings of macro cells, and the like that currently have, or will have in the future, reached resource exhaustion. In particular, resource analysis 202 can determine future inabilities, by network infrastructure, to be able to satisfy or service expected increases in future traffic volume flows.

In regard to resource analysis 202, in some embodiments, the network infrastructure can be associated with an identified MNO entity, whereas in other embodiments the network infrastructure can be affiliated with disparate identified and/or unidentified MNO entities. Generally, data obtained from network infrastructure should typically be reflective of, and/or representative of, a determinable bin or one or more aggregations of determinable bins that can correspond with an identifiable structure and/or its surrounding areas (e.g., immediate areas surrounding that can: abut, are proximate with, are contiguous in relation to, the structure and/or its ancillary associated areas, such as parking areas, patios, enclosed frontages, unenclosed frontages, curtilage, and the like. The data can be obtained from network equipment that provide coverage (e.g., subsector, sector, groupings of subsectors, or grouping of sectors, . . . ) to a specified bin and/or identified groups of bins. The resource analysis 202 can use the data fed forward from the network infrastructure to determine or predict when resource scarcity or resource exhaustion is to occur (e.g., immediately, within the next 12 months, between 13 and 18 months, etc.). Mitigation or amelioration of resource scarcity, resource sparsity, and/or resource paucity can be through the addition of supplementary network infrastructure and/or through use of augmentative processes that can make better use of existing network infrastructure.

Figure 3:
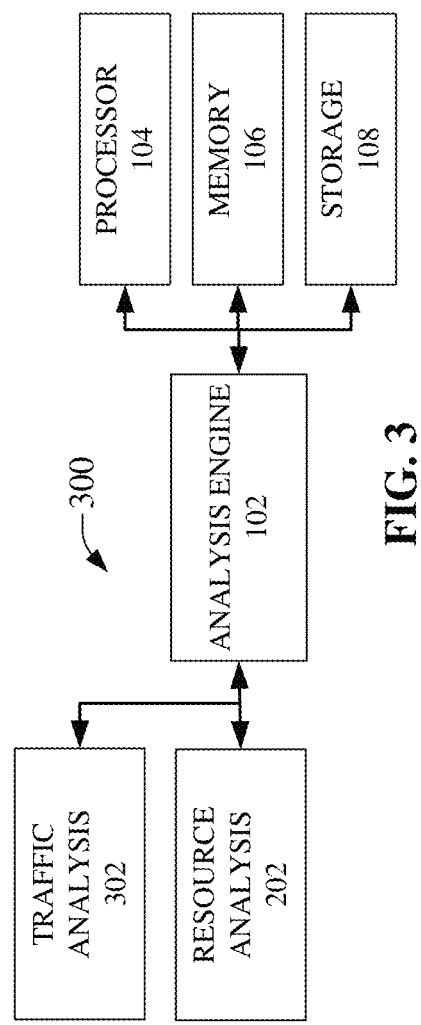
FIG. 3 provides depiction of an additional system that provides indoor planning data that can be used to increase the density of mobility networks, in accordance with aspects of the subject disclosure.

FIG. 3 depicts an additional representation of system 100, now referenced as system 300, for the provision or supply of indoor planning data that can be used to increase the density of mobility networks, in accordance with aspects of the subject disclosure. System 300 can include a component that facilitates traffic analysis 302, and that, in collaboration with the facilities provided by resource analysis 202, analysis engine 102, processor 104, memory 106, and/or storage 108, determines predicted future flows or future levels of traffic (e.g., traffic volumes or traffic flows) within defined bin areas at defined time periods (e.g., now, within the next 12 months, between 13 and 18 months, etc.). Traffic analysis 302 can determine such future levels of predicted traffic based on a data density layer construct that can comprise data relating whether or not user equipment associated with MNO entities are located within areas demarcated as bins of determinable or determined size; information as to where user equipment associated with an MNO entity is located (cluttered) in relation to the MNO entity's network infrastructure. This cluttering information can be provided by a service, such as ArisoGEO, that identifies user equipment that can be determined as being operational with regard to network infrastructure associated with MNO entities, and that can be determined as being located within defined geographic areas (e.g., a bin area). The clutter information representative of user equipment situated within defined bin can thereafter be associated with one or more weights.

Additional information that can be included in the data density layer construct can comprise data related to user equipment behavior data. User equipment behavior data can be related to RF event count data that can provide indications regarding user equipment establishing calls, terminating calls, connecting to network infrastructure, disconnecting from network infrastructure, hopping between disparate segments of the network infrastructure, dropped call events, and the like. Additional data pertaining to user equipment behavior data can comprise times associated with RF events, type of RF events, geographical locations of RF event, etc.

User equipment behavior data can be used to pinpoint where user equipment is located at particular instances in time with reference to network infrastructure.

Further information that can also be included in the data density layer construct can include location data representative of where enterprises (e.g., military, commercial, sporting, and/or retail establishments and/or organizations) are located. As noted above, example business enterprises can include manufacturing facilities, hospitals, government offices, airports, military facilities, museums, arenas/stadiums, convention centers, shopping malls, and other high demand venues. Generally, enterprise data can include at least the location of the enterprises (e.g., GPS coordinates, geographical latitude and/or latitude coordinates, generated geo-location codes, ZIP Code, postal area codes, . . . ).

The data density layer construct can also comprise subscriber information location (SIL) data. As noted above, subscriber information location data can be provided by, and/or retrieved from, one or more databases that can be affiliated with, under the control of, and/or maintained by, one or more MNO entities. Typically, SIL data can be representative of billing data and/or subscriber data. Billing data and/or subscriber data can comprise billing address data affiliated with a subscriber entity (e.g., user entity, business entity, . . . ), subscriber usage statistics (e.g., when a subscriber uses assigned user equipment, the most to least number of hours of use of the user equipment, duration of time of use of the user equipment, trends of usage associated with the user equipment, . . . ), and the like.

Figure 4:
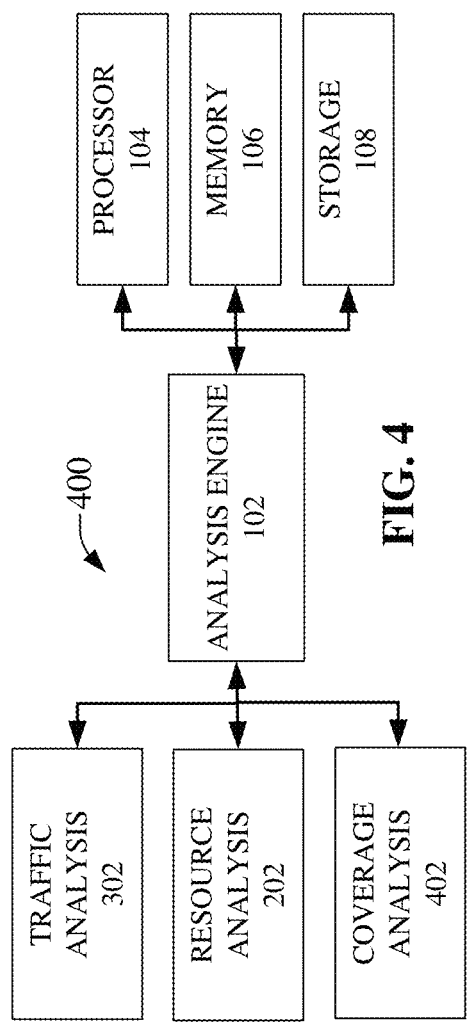
FIG. 4 provides illustration of another system that provides indoor planning data that can be used to increase the density of mobility networks, in accordance with aspects of the subject disclosure.

FIG. 4 provides further illustration of system 100, now referenced as system 400, for the provision or supply of indoor planning data that can be used to increase the density of mobility networks, in accordance with aspects of the subject disclosure. System 400 can comprise coverage analysis 402 can include a component that facilitates coverage analysis 402, and that, in conjunction with the facilities provided by traffic analysis 302, resource analysis 202, analysis engine 102, processor 104, memory 106, and/or storage 108, determines the coverage, or lack of coverage, provided to user equipment by the surrounding network infrastructure. Coverage analysis 402 can use one or more quality of service metric such as signal-to-noise ratio (SNR) data, reference signals received power (RSRP) data, reference signal received quality (RSRQ) data, returned signal strength indicator (RSSI) data, etc. As noted earlier, structures that exhibit measurements, based on SNR data values, RSRP data values, RSRQ data values, and the like, that are acceptable and/or high will generally not be ranked or ordered as high as structures that are determined to have comparatively low or negligible SNR values, low or negligible RSRP values, low or negligible RSRQ values, etc. In other words, based on SNR data values, RSRP data values, RSRQ data values, and the like, when analysis engine 102 determines that a structure has a low to unacceptable value, such a structure can be ranked or ordered higher in a grouping of structures that have better SNR data values, RSRP data values, RSRQ data values, etc.

Figure 5:
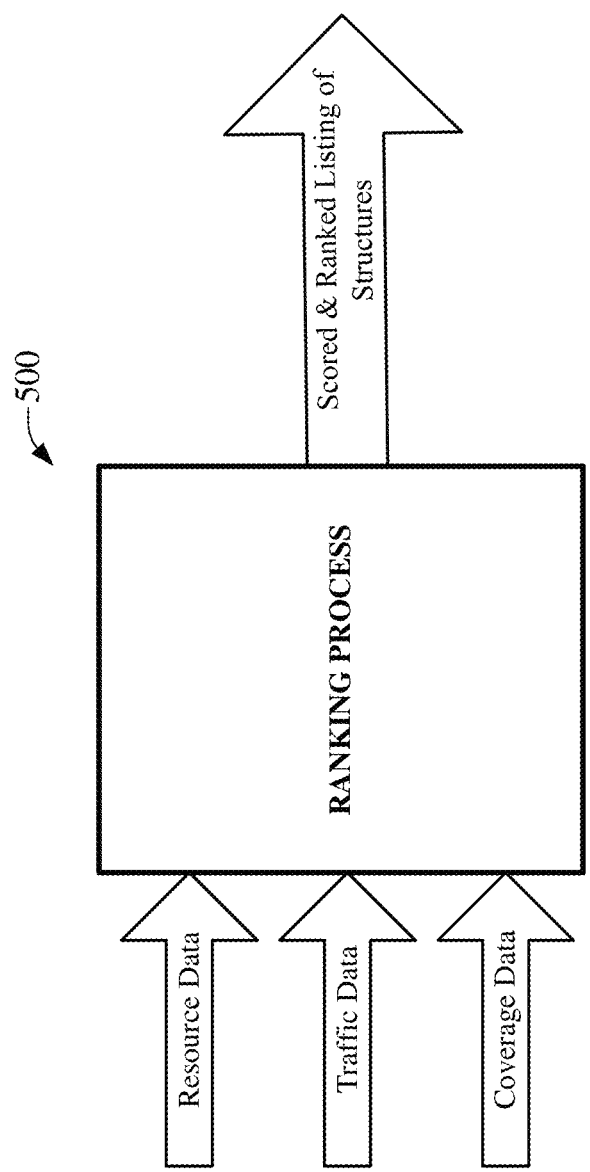
FIG. 5 provides depiction of a data flow for the provision of indoor planning data that can be used to increase the density of mobility networks, in accordance with aspects of the subject disclosure.

FIG. 5 illustrates data flows into, and a data flow out of, a ranking process 500. The ranking process can receive resource data from the resource analysis process 202, traffic data from the traffic analysis process 302, and/or coverage data from the coverage analysis 402. The ranking process can then apply a ranking or ordering formulation to identify and/or determine candidate structures that, on an objective basis, will beneficially assist a MNO to mitigate current (and/or prospective) resource allocation deficiencies, ameliorate traffic volume and/or traffic flow bottlenecks, and/or overcome insufficiencies with regard to identified or identifiable coverage concerns in the context of determined structures.

Figure 6:
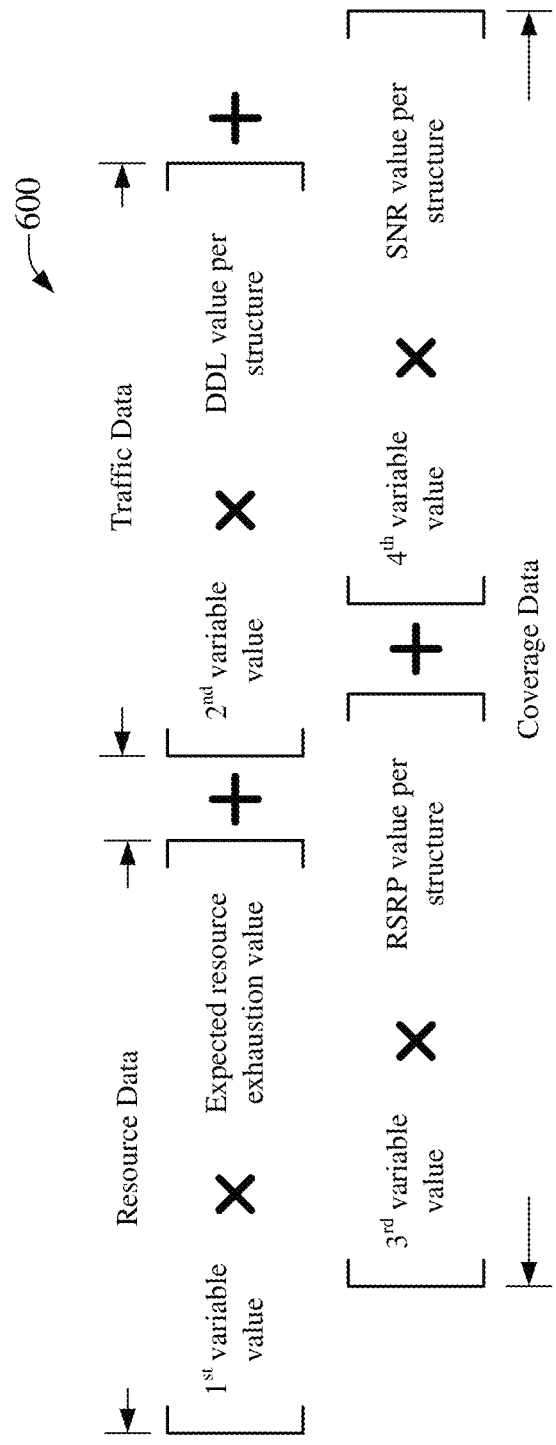
FIG. 6 provides illustration of an example ranking or ordering quantification metric that provides indoor planning data that can be used to increase the density of mobility networks, in accordance with aspects of the subject disclosure.

With reference to FIG. 6 an example ranking or ordering formulation 600 is depicted. Ranking or ordering formulation 600 has beneficially used to mitigate current (and/or prospective) resource allocation deficiencies, ameliorate traffic volume and/or traffic flow bottlenecks, and/or overcome insufficiencies with regard to identified or identifiable coverage concerns in the context of determined structures. Ranking or ordering formulation 600 can comprise three aspects, a resource data aspect, a traffic data aspect, and a coverage data aspect. The resource data aspect can comprise a 1st variable value and an expected resource exhaustion value that can have been obtained from, for instance, resource analysis 202, wherein the resource data aspect is determined as the product of the 1st variable value and the a expected resource exhaustion value. Further, the traffic data aspect can comprise a 2nd variable value and a DDL value per structure that can have been supplied by, for example, traffic analysis 302, wherein the traffic data aspect can be determined as the product of the 2nd variable value and the DDL value per structure. The coverage data aspect can comprise two component aspects, a first component aspect and a second component aspect. The first component aspect can comprise a 3rd variable value and a RSRP value per structure, wherein the first component aspect is determined as the product of the 3rd variable value and the RSRP value per structure. The 1st variable value can be an adjustable weighting value. The second component aspect can comprise a 4th variable value and a SNR value per structure, wherein the second component aspect can be determined as the product of the 4th variable value and SNR value per structure. Thereafter a summation (or aggregation) of the resource data aspect, the traffic data aspect, and the coverage data aspect can be effectuated to determine a score (or value) to be associated with a particular structure.

In regard to the foregoing 1st variable value, 2nd variable value, 3rd variable value, and 4th variable value, these can be weighting values that can be determined through use of one or more machine-learning techniques, deep learning processes, and/or artificial intelligence paradigms, using, for instance, one or more training sets or collections of training parameters determined as a function of historical precedent. In some embodiments, the utilization of machine-learning techniques, deep learning processes, data analytics, and/or artificial intelligence paradigms can entail the use of probabilistic modeling using groups of training sets, Bayesian belief networks, neural networking systems, fuzzy logic, and/or use of cost benefit analyses to determine the various costs associated with taking particular courses of action (e.g., selecting a particular variable value); determine the various benefits associated with taking the courses of action (e.g., selecting the particular variable value); and comparing the resultant costs and resultant benefits to determine an appropriate weight value to use. Additionally and/or alternatively, Pareto efficiencies and/or Pareto optimality analyses can be effectuated to ensure that no individual criterion, or grouping of preference criteria, is made better off at the expense of making another individual criterion, or grouping of preference criteria, worse off. Weighting values that have been found to be of beneficial use have been: 3, 2, 0.5, and 0.5 respectively associated with: "Expected Resource Exhaustion value," "DDL value per structure," "RSRP value per structure," and "SNR value per structure"). These values have, to date, nevertheless been determined heuristically via common experience.

With regard to the values associated with "Expected Resource Exhaustion value," "DDL value per structure," "RSRP value per structure," and "SNR value per structure," these can be obtained from the tables set forth in FIG. 7. The respective pairings of range of values (e.g., 0-6) to respective "Expected Resource Exhaustion value," "DDL value per structure," "RSRP value per structure," and "SNR value per structure," can be tuned as needs and/or requirements dictate. For instance, in some embodiments, the range of values (5-6) associated with "Expected Resource Exhaustion value," depicted in Table 1, can be tuned to be "6 months or less to resource exhaustion," rather than "12 months of less to resource exhaustion." As will be appreciated by those having skill in the art, the associated pairing for the remainder of the table entries, if necessary, would also need to be adjusted accordingly.

Figure 8:
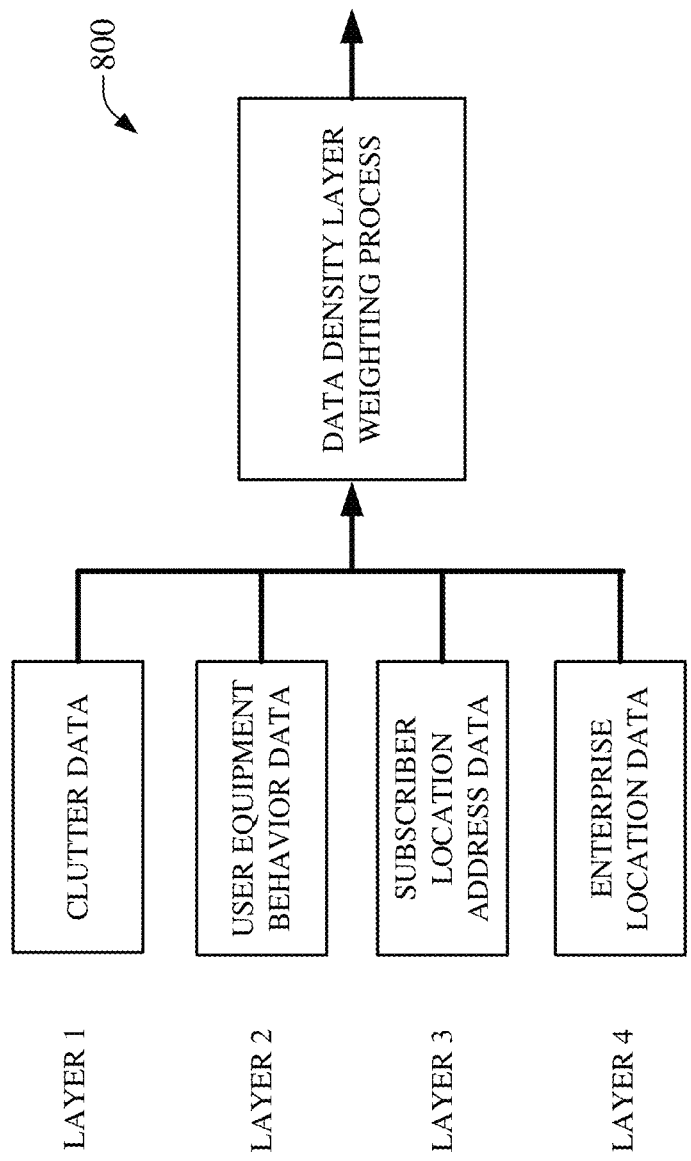
FIG. 8 provides illustration data flow used to supply indoor planning data that can be used to increase the density of mobility networks, in accordance with aspects of the subject disclosure.

FIG. 8 illustrates a data flow 800 representing the component aspects that can be used to establish a data density layer (DDL) construct. As depicted, the data flow 800 can have at least four layers: a clutter layer (layer 1); a user equipment behavior layer (layer 2); a subscriber location address data layer (layer 3); and an enterprise location data layer (layer 4).

Layer 1 (clutter data) can comprise data relating whether or not user equipment associated with MNO entities are located within areas demarcated as bins of determinable or determined size. In particular, layer 1 can be information detailing where user equipment associated with an MNO entity (and/or disparate other MNO entities) is located (cluttered or clustered) in relation to the MNO entity's network infrastructure (and/or disparate other MNO entities network infrastructure). In some embodiments, the cluttering information can be provided by a service that identifies user equipment that can be determined as being operational with regard to network infrastructure associated with a plethora of MNO entities, and that can be determined as being located within defined geographic areas (e.g., a determinable bin area). The clutter information representative of user equipment situated within defined bin areas can thereafter be associated with one or more weights (e.g., by a data density layer weighting process).

Layer 2 (user equipment behavior data) can comprise data related to user equipment behavior data. User equipment behavior data can be related to RF event count data that can provide indications regarding user equipment establishing calls, terminating calls, connecting to network infrastructure, disconnecting from network infrastructure, hopping between disparate segments of the network infrastructure, dropped call events, and the like. Additional data pertaining to user equipment behavior data also can comprise times associated with RF events, type of RF events, geographical locations of RF event, etc. User equipment behavior data can be used to pinpoint where user equipment is located at particular instances in time with reference to network infrastructure. Further, when layer 2 data is input to a data density layer weighting process, one or more weight values can be assigned to this data.

Layer 3 (subscriber location address data) can comprise subscriber information location (SIL) data. As noted above, subscriber information location data can be provided by, and/or retrieved from, one or more databases that can be affiliated with, under the control of, and/or maintained by, one or more MNO entities. Typically, SIL data can be representative of billing data and/or subscriber data. Billing data and/or subscriber data can comprise billing address data associated with a subscriber entity, subscriber usage statistics data, and the like. Layer 3 data can be fed forward to a data density layer weighting process wherein the data density layer weighting process, if necessary, can assign appropriate weighting values to the layer 3 data.

Layer 4 (enterprise location data) can comprise location data representative of where enterprises, such as military facilities, commercial establishments, sporting venues, and/or other commercial establishments and/or organizations) are located. As noted above, example business enterprises can include manufacturing facilities, hospitals, government offices, airports, military facilities, museums, arenas/stadiums, convention centers, shopping malls, and other high demand venues. Generally, enterprise data can include at least the location of the enterprises (e.g., GPS coordinates, geographical latitude and/or latitude coordinates, generated geo-location codes, ZIP Code, postal area codes, . . . ). Layer 4 data, like layer 3 data, can be forwarded to a data density layer weighting process wherein the data density layer weighting process, if required, can assign appropriate weighting values to the layer 3 data.

The data density layer weighting process, in addition to providing appropriate weight values to its disparate inputs (e.g., layer 1 data, layer 2, data, layer 3 data, and/or layer 4 data), can also variously synthesize the layer 1 data, layer 2, data, layer 3 data, and/or layer 4 data to generate a data density construct representing an amount of traffic (traffic volume or an aggregated traffic flow) traversing through network infrastructure in the service of user equipment within a particular structure, wherein the structure can be represented as one or more bins of a determined or determinable area.

It should be noted that while the data density layer weighting process is described as comprising at least four layer, in some embodiments, few layers are permissible, and in additional and/or alternative embodiments more layers can be utilized with equal facility and/or functionality without limiting or departing from the scope and/or intent of the subject disclosure.

Figure 9:
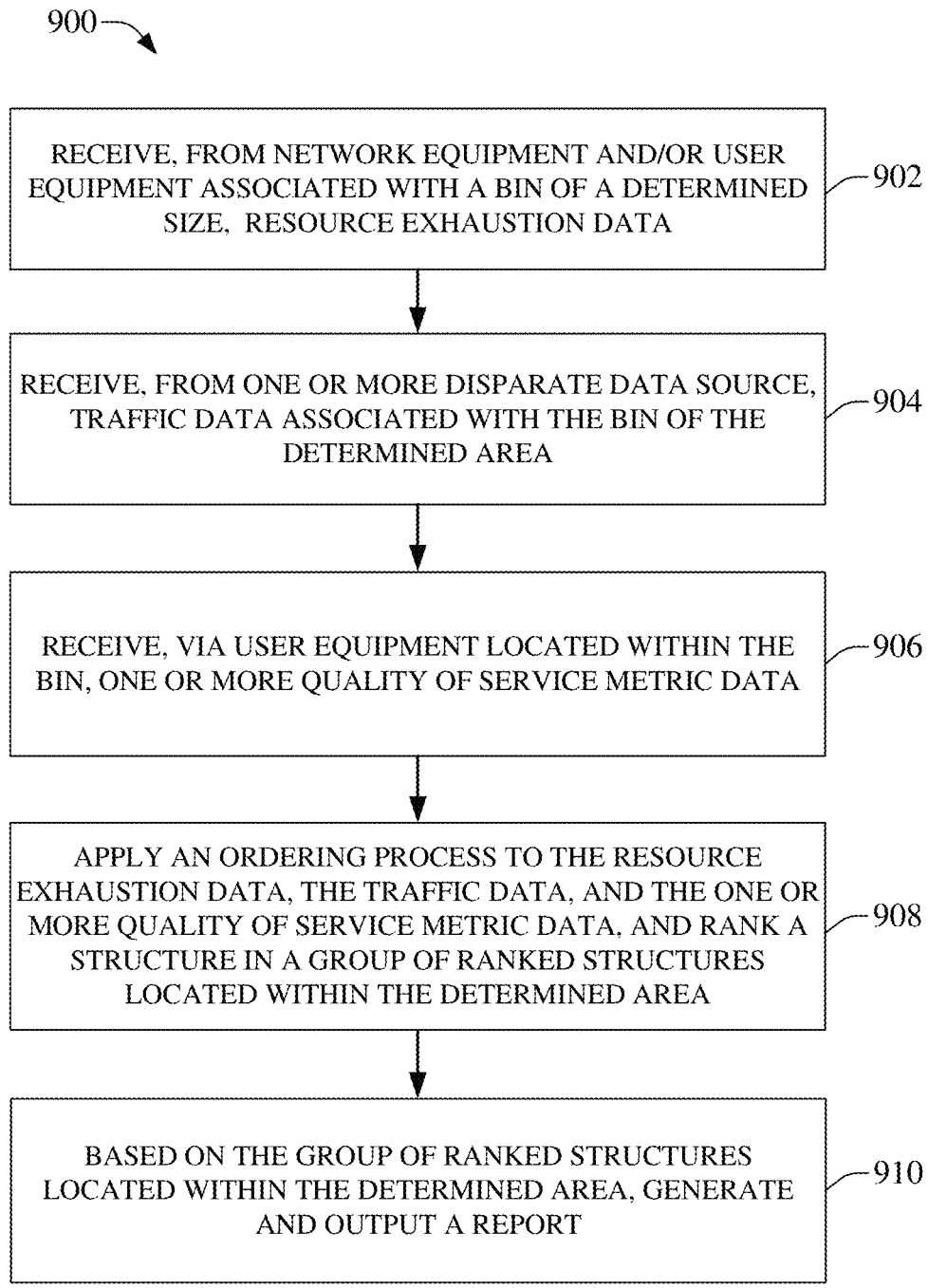
FIG. 9 provides illustration of a flow chart or method for the provision of indoor planning data that can be used to increase the density of mobility networks, in accordance with aspects of the subject disclosure.

In view of the example system(s) described above, example method(s) that can be implemented in accordance with the disclosed subject matter can be better appreciated with reference to the flowcharts in FIG. 9. For purposes of simplicity of explanation, example method disclosed herein is presented and described as a series of acts; however, it is to be understood and appreciated that the disclosure is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, the disclosed example method can be implemented in combination with one or more other methods, to accomplish one or more aspects herein described. It should be further appreciated that the example method disclosed throughout the subject specification are capable of being stored on an article of manufacture (e.g., a computer-readable medium) to allow transporting and transferring such methods to computers for execution, and thus implementation, by a processor or for storage in a memory.

FIG. 9 illustrates a method 900 for the provision or supply of indoor planning data that can be used to increase the density of mobility networks, in accordance with aspects of the subject disclosure. Method 900 can commence at act 902 where resource exhaustion data can be received from network equipment and/or user equipment, wherein the resource exhaustion data is representative of the resource exhaustion data measured or determined within the bin of a determinate size. At act 904 traffic data associated with the bin of determine size can be received from one or more disparate data source. At act 906 one or more quality of service metric, such as RSRP data and/or SNR data, can be received from network infrastructure and/or user equipment situated with the defined bin of determinate size. At act 908 an ordering or ranking process can be applied to the received resource exhaustion data, the traffic data, and/or the quality of metric data, wherein the ordering and/or ranking process can use, for instance, an ordering and/or ranking process similar to: (1st variable value×Expected Resource Exhaustion value)+(2nd variable value×DDL value per structure)+(third variable value×RSRP value per structure)+(4th variable value×SNR value per structure). Nevertheless, in regard to the foregoing ranking and/or ordering formulation, any other ranking or ordering methodology can be used with equal facility and/or functionality without departing for the scope and/or intent of the subject disclosure. At act 910 a group of ranked or ordered structures located within a defined or definable geographic area can be output. The output group of ranked and/or ordered structures located within the defined or definable geographic area can thereafter be used by MNO entities to mitigate inefficiencies with current (and/or predicted) resource allocations, ameliorate traffic volume and/or traffic flow bottlenecks, and/or overcome insufficiencies with regard to identified or identifiable coverage concerns in the context of determined structures located in defined geographic areas.

It should be realized and appreciated by those of ordinary skill, the foregoing non-limiting example use application(s) are merely illustrations of a use to which the disclosed and described solution can be applied and thus are provided solely for the purposes of exposition. The described and disclosed subject matter is therefore not limited to the foregoing example application(s), but can find applicability in other more generalized circumstances and use applications.

Figure 10:
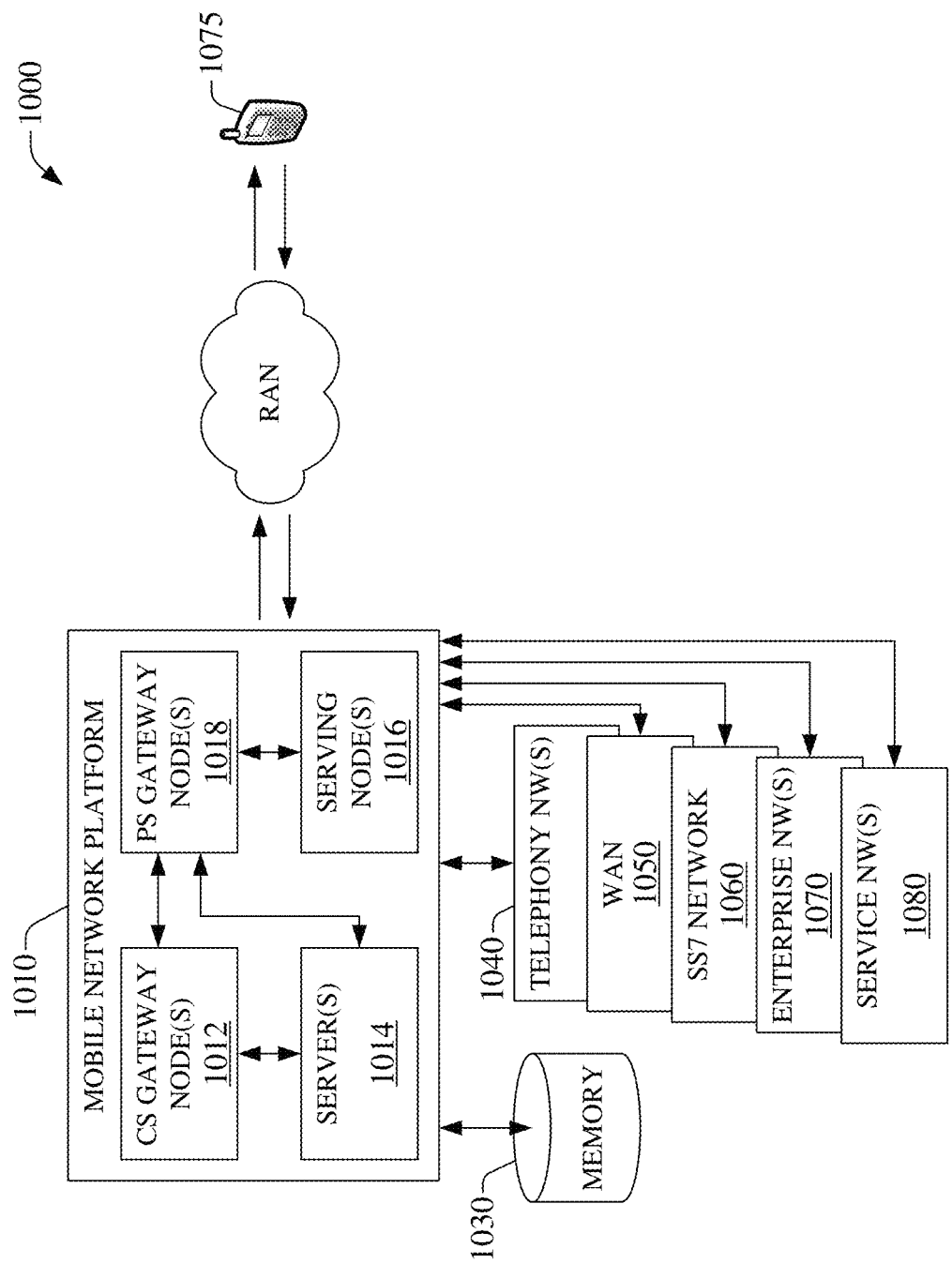
FIG. 10 is a block diagram of an example embodiment of a mobile network platform to implement and exploit various features or aspects of the subject disclosure.

FIG. 10 presents an example embodiment 1000 of a mobile network platform 1010 that can implement and exploit one or more aspects of the disclosed subject matter described herein. Generally, wireless network platform 1010 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1010 can be included in telecommunications carrier networks, and can be considered carrier-side components as discussed elsewhere herein. Mobile network platform 1010 includes CS gateway node(s) 1012 which can interface CS traffic received from legacy networks like telephony network(s) 1040 (e.g., public switched telephone network (PSTN), or public land mobile network (PLMN)) or a signaling system #7 (SS7) network 1070. Circuit switched gateway node(s) 1012 can authorize and authenticate traffic (e.g., voice) arising from such networks. Additionally, CS gateway node(s) 1012 can access mobility, or roaming, data generated through SS7 network 1060; for instance, mobility data stored in a visited location register (VLR), which can reside in memory 1030. Moreover, CS gateway node(s) 1012 interfaces CS-based traffic and signaling and PS gateway node(s) 1018. As an example, in a 3GPP UMTS network, CS gateway node(s) 1012 can be realized at least in part in gateway GPRS support node(s) (GGSN). It should be appreciated that functionality and specific operation of CS gateway node(s) 1012, PS gateway node(s) 1018, and serving node(s) 1016, is provided and dictated by radio technology(ies) utilized by mobile network platform 1010 for telecommunication.

In addition to receiving and processing CS-switched traffic and signaling, PS gateway node(s) 1018 can authorize and authenticate PS-based data sessions with served mobile devices. Data sessions can include traffic, or content(s), exchanged with networks external to the wireless network platform 1010, like wide area network(s) (WANs) 1050, enterprise network(s) 1070, and service network(s) 1080, which can be embodied in local area network(s) (LANs), can also be interfaced with mobile network platform 1010 through PS gateway node(s) 1018. It is to be noted that WANs 1050 and enterprise network(s) 1070 can embody, at least in part, a service network(s) like IP multimedia subsystem (IMS). Based on radio technology layer(s) available in technology resource(s) 1017, packet-switched gateway node(s) 1018 can generate packet data protocol contexts when a data session is established; other data structures that facilitate routing of packetized data also can be generated. To that end, in an aspect, PS gateway node(s) 1018 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1000, wireless network platform 1010 also includes serving node(s) 1016 that, based upon available radio technology layer(s) within technology resource(s) 1017, convey the various packetized flows of data streams received through PS gateway node(s) 1018. It is to be noted that for technology resource(s) 1017 that rely primarily on CS communication, server node(s) can deliver traffic without reliance on PS gateway node(s) 1018; for example, server node(s) can embody at least in part a mobile switching center. As an example, in a 3GPP UMTS network, serving node(s) 1016 can be embodied in serving GPRS support node(s) (SGSN).

For radio technologies that exploit packetized communication, server(s) 1014 in wireless network platform 1010 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1010. Data streams (e.g., content(s) that are part of a voice call or data session) can be conveyed to PS gateway node(s) 1018 for authorization/authentication and initiation of a data session, and to serving node(s) 1016 for communication thereafter. In addition to application server, server(s) 1014 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1010 to ensure network's operation and data integrity in addition to authorization and authentication procedures that CS gateway node(s) 1012 and PS gateway node(s) 1018 can enact. Moreover, provisioning server(s) can provision services from external network(s) like networks operated by a disparate service provider; for instance, WAN 1050 or Global Positioning System (GPS) network(s) (not shown). Provisioning server(s) can also provision coverage through networks associated to wireless network platform 1010 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 1075.

It is to be noted that server(s) 1014 can include one or more processors configured to confer at least in part the functionality of macro network platform 1010. To that end, the one or more processor can execute code instructions stored in memory 1030, for example. It is should be appreciated that server(s) 1014 can include a content manager 1015, which operates in substantially the same manner as described hereinbefore.

In example embodiment 1000, memory 1030 can store information related to operation of wireless network platform 1010. Other operational information can include provisioning information of mobile devices served through wireless platform network 1010, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1030 can also store information from at least one of telephony network(s) 1040, WAN 1050, enterprise network(s) 1070, or SS7 network 1060. In an aspect, memory 1030 can be, for example, accessed as part of a data store component or as a remotely connected memory store.

Figure 11:
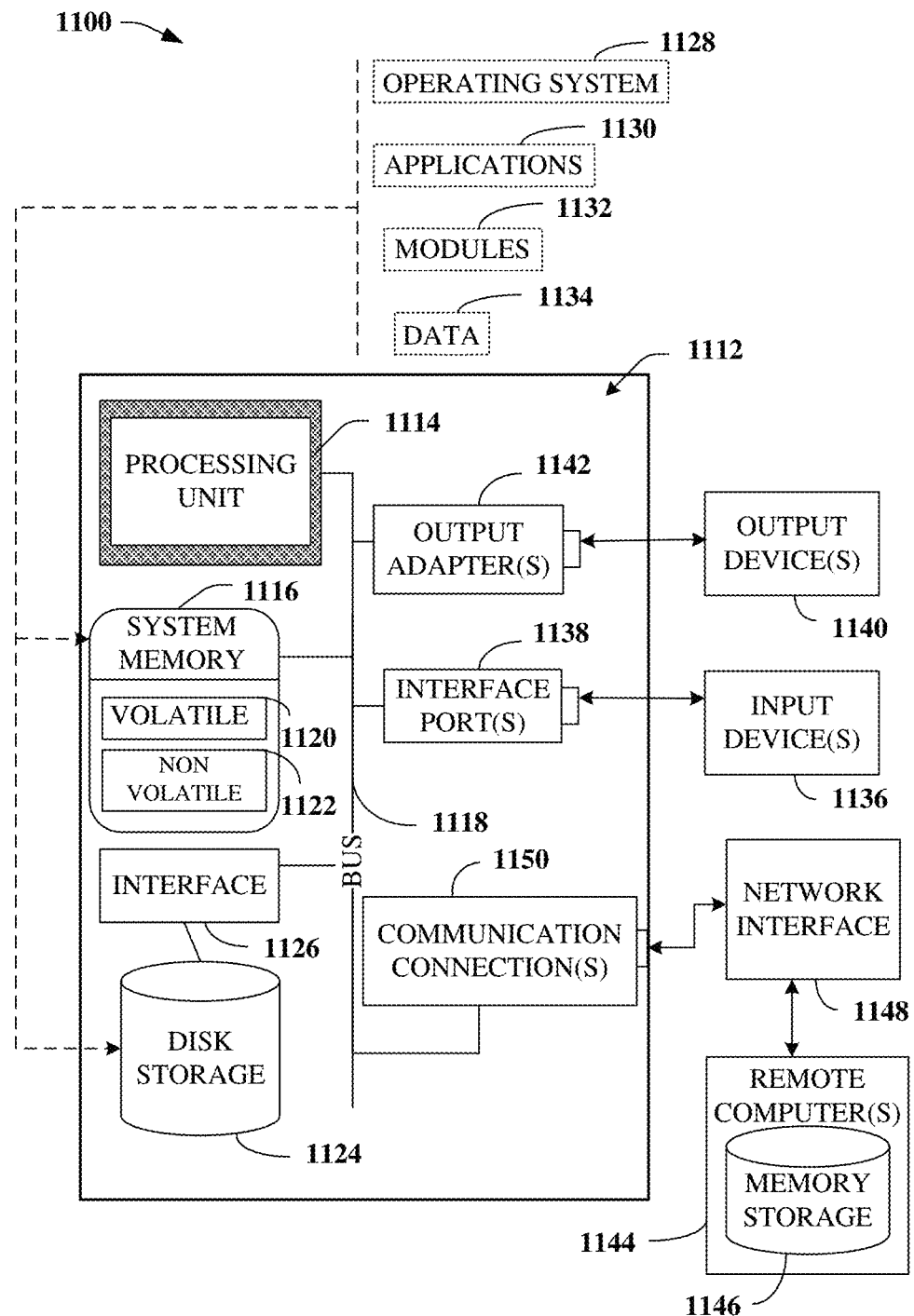
FIG. 11 illustrates a block diagram of a computing system operable to execute the disclosed systems and methods in accordance with an embodiment.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1120 (see below), non-volatile memory 1122 (see below), disk storage 1124 (see below), and memory storage 1146 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 11 illustrates a block diagram of a computing system 1100 operable to execute the disclosed systems and methods in accordance with an embodiment. Computer 1112, which can be, for example, part of the hardware of system 110, includes a processing unit 1114, a system memory 1116, and a system bus 1118. System bus 1118 couples system components including, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1116 can include volatile memory 1120 and nonvolatile memory 1122. A basic input/output system (BIOS), containing routines to transfer information between elements within computer 1112, such as during start-up, can be stored in nonvolatile memory 1122. By way of illustration, and not limitation, nonvolatile memory 1122 can include ROM, PROM, EPROM, EEPROM, or flash memory. Volatile memory 1120 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 can also include removable/non-removable, volatile/non-volatile computer storage media. FIG. 11 illustrates, for example, disk storage 1124. Disk storage 1124 includes, but is not limited to, devices like a magnetic disk drive, floppy disk drive, tape drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to system bus 1118, a removable or non-removable interface is typically used, such as interface 1126.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 11 describes software that acts as an intermediary between users and computer resources described in suitable operating environment 1100. Such software includes an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be noted that the disclosed subject matter can be implemented with various operating systems or combinations of operating systems.

A user can enter commands or information into computer 1112 through input device(s) 1136. As an example, mobile device and/or portable device can include a user interface embodied in a touch sensitive display panel allowing a user to interact with computer 1112. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1114 through system bus 1118 by way of interface port(s) 1138. Interface port(s) 1138 include, for example, a serial port, a parallel port, a game port, a universal serial bus (USB), an infrared port, a Bluetooth port, an IP port, or a logical port associated with a wireless service, etc. Output device(s) 1140 use some of the same type of ports as input device(s) 1136.

Thus, for example, a USB port can be used to provide input to computer 1112 and to output information from computer 1112 to an output device 1140. Output adapter 1142 is provided to illustrate that there are some output devices 1140 like monitors, speakers, and printers, among other output devices 1140, which use special adapters. Output adapters 1142 include, by way of illustration and not limitation, video and sound cards that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, cloud storage, cloud service, a workstation, a microprocessor based appliance, a peer device, or other common network node and the like, and typically includes many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically connected by way of communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A device, comprising:
   a processor; and
   a memory that stores executable instructions that, when executed by the processor, facilitate performance of operations, comprising:
   receiving, via network equipment, resource exhaustion data indicative of radio spectrum usage within a determined bin representing a defined geographic area;
   receiving, via the network equipment, traffic data associated with the determined bin, wherein the traffic data indicates a volume of data flowing into the determined bin;
   receiving, via the network equipment, coverage data representing a quality of service metric data indicative of a determined reference signal receive power (RSRP) metric; and
   based on applying a ranking process to the resource exhaustion data, the traffic data, and the coverage data, generating a ranked list of structures, wherein a structure of the ranked list of structures is included in the determined bin.

2. The device of claim 1, wherein the traffic data comprises clutter data representing user equipment in communication with the network infrastructure situated in the determined bin.

3. The device of claim 1, wherein the traffic data comprises user equipment behavior data representing an call establishment event between user equipment and the network infrastructure.

4. The device of claim 1, wherein the traffic data comprises subscriber location address data representing an address of a user identity associated with user equipment located within the determined bin.

5. The device of claim 1, wherein the traffic data comprises enterprise location data representing an address of an enterprise located within the determined bin.

6. The device of claim 1, wherein the traffic data is supplied to a data density layer weighing process that determines a weight associated with clutter data included in the traffic data, and wherein the weight is determined as a function of identifying user equipment in communication with the network infrastructure located within the determined bin.

7. The device of claim 1, wherein the structure is associated with attribute data representative of an age of the structure, an address of the structure, and global positioning infrastructure coordinate data associated with the structure.

8. The device of claim 1, wherein the structure is a first structure, and wherein the first structure is associated with attribute data representative of usage type data associated with the first structure, relative height data representative of a first height of the first structure in comparison with a second height of a second structure of the ranked list of structures, first construction date data associated with the first structure, and second construction date data associated with the second structure.

9. A method, comprising:
   receiving, by a system comprising a processor, resource exhaustion data indicative of radio spectrum usage within a determined bin representing a defined geographic area;
   receiving, by the system, traffic data associated with the determined bin, wherein the traffic data indicates a volume of data flowing into the determined bin;
   receiving, by the system, coverage data representing a quality of service metric data indicative of a determined signal to noise ratio data; and
   generating, by the system, an ordered list of structures by executing a ranking process to the resource exhaustion data, the traffic data, and the coverage data, wherein a structure of the ordered list of structures is included in the determined bin.

10. The method of claim 9, further comprising determining, by the system, the volume of data based on clutter data representing user equipment in communication with network equipment, wherein the user equipment and the network equipment are located within the determined bin.

11. The method of claim 9, further comprising determining, by the system, the volume of data based on user equipment behavior data representing an call establishment event facilitated by user equipment via network equipment.

12. The method of claim 9, wherein the traffic data comprises subscriber location address data representing an address of a user identity associated with user equipment located within the determined bin.

13. The method of claim 9, wherein the traffic data comprises enterprise location data representing an address of an enterprise entity located within the determined bin.

14. The method of claim 9, wherein the traffic data is forwarded to a data density layer weighing process that determines a weight associated with clutter data included in the traffic data, wherein the weight is determined based on first user equipment being in communication with second user equipment via network equipment, and wherein the first user equipment and the network equipment are located within the determined bin.

15. The method of claim 9, wherein the traffic data is forwarded to a data density layer weighing process that determines a weight associated with clutter data included in the traffic data, wherein the weight is determined based on first user equipment being in communication with second user equipment via network equipment, and wherein the second user equipment and the network equipment are located within the determined bin.

16. The method of claim 9, wherein the traffic data is forwarded to a data density layer weighing process that determines a weight associated with clutter data included in the traffic data, wherein the weight is determined based on first user equipment being in communication with second user equipment via network equipment, and wherein the network equipment is located within the determined bin.

17. The method of claim 9, wherein the structure is a first structure, and wherein the first structure is associated with attribute data representative of usage type data associated with the first structure, relative height data representative of a first height of the first structure in comparison with a second height of a second structure of the ordered list of structures, first construction date data associated with the first structure, and second construction date data associated with the second structure.

18. A non-transitory machine-readable medium, comprising executable instructions that, when executed by a processor, facilitate performance of operations, comprising:
receiving resource exhaustion data indicative of radio spectrum usage within a determined bin representing a defined geographic area;
receiving traffic data associated with the determined bin, wherein the traffic data indicates a volume of data flowing into the determined bin;
receiving coverage data representing a quality of service metric data indicative of a determined signal to noise ratio data; and
generating an ordered group of structures by executing an ordering process to the resource exhaustion data, the traffic data, and the coverage data, wherein a structure of the ordered group of structures is included in the determined bin.

19. The non-transitory machine-readable medium of claim 18, wherein the operations further comprise determining the volume of data based on cluster data representing a clustering of user equipment in communication with network equipment, wherein the user equipment are located within the determined bin.

20. The non-transitory machine-readable medium of claim 19, wherein the operations further comprise determining the volume of data based on user equipment behavior data representing an call establishment event facilitated by user equipment via network equipment.

* * * * *